O. SCHULZ.
TRUCK.
APPLICATION FILED FEB. 9, 1921.

1,414,672.

Patented May 2, 1922.

Witness:
A. J. Sauser

Inventor:
Otto Schulz,
By A. Miller Belfield Atty.

UNITED STATES PATENT OFFICE.

OTTO SCHULZ, OF CHICAGO, ILLINOIS.

TRUCK.

1,414,672.  Specification of Letters Patent.  Patented May 2, 1922.

Application filed February 9, 1921. Serial No. 443,506.

*To all whom it may concern:*

Be it known that I, OTTO SCHULZ, a citizen of the United States, residing at Chicago, in the county of Cook and State of Illinois, have invented a certain new and useful Improvement in Trucks, of which the following is a full, clear, concise, and exact description, reference being had to the accompanying drawings, forming a part of this specification.

My invention relates to trucks.

The principal object of the invention is to provide a truck which can be used to support and convey a piano or other angular shaped body.

Another object of the invention is to permit the piano case or angular shaped body to be quickly and readily placed on or removed from the truck.

Another object of the invention is to arrange for the effective movement of the truck either on a floor or similar service or on tracks.

Another object of the invention is to permit access to the piano or body while on the truck so that work may be done upon the same while so mounted.

In the accompanying drawings Fig. 1 is an end elevation of the truck embodying my present invention, showing a piano case mounted thereon;

Figure 1:
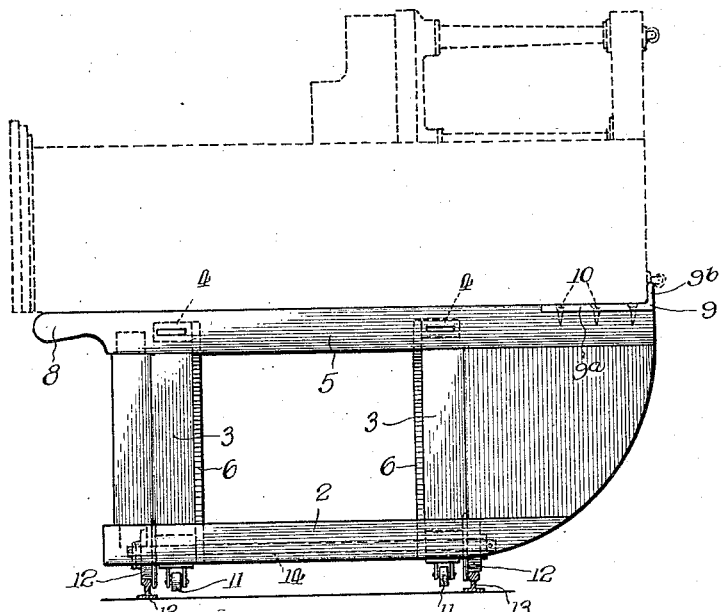

In the drawings I show a truck comprising side lower horizontal members 1—1 and end horizontal members 2—2, also upright members 3—3 and side upper horizontal members 4—4 and horizontal end members 5—5. There are also preferably braces 6—6 extending diagonally between the side members 1—1 and 4—4 and secured to the same.

Figure 2:
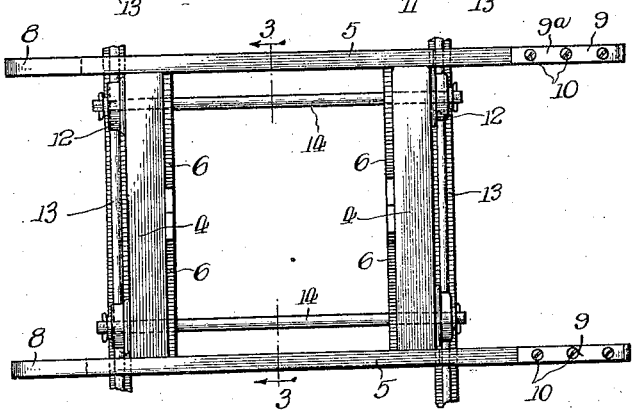
Fig. 2 is a plan view of the truck.

The members 5—5 are heavy substantial beams and their upper edges are substantially above the cross members 4—4. Together they provide a support for the piano or its body, as shown in dotted lines in Fig. 1. Preferably the ends of these members 5—5, as for example the left hand ends, referring to Figs. 1 and 2, are made in handle form as shown at 8—8. The other ends are preferably provided with engaging and lifting devices 9—9 by which the corner of the piano or other angular shaped body may be engaged and held. For example, the truck may be grasped by the handles 8—8 and tilted angularly by lifting such handles and lowering the members 9—9 until the members 5—5 are in substantially vertical position. The members 9—9 may then be pushed underneath the piano body as permitted by the same being elevated slightly above the floor because of the casters or rollers on said body. The truck may then be swung down to its normal position in which the members 5—5 are substantially horizontal and the piano body will then rest as shown in dotted lines in Fig. 1. The members 9—9 are preferably constructed with longitudinally extending portions $9^a$ secured as by screws 10 to said members 5—5, and laterally extending ends or projections $9^b$ projecting from said portions $9^a$ in an upwardly direction when the members 5 are horizontal. The portions $9^b$ may be pushed underneath the piano body so as to engage the same, as above set forth.

Figure 3:
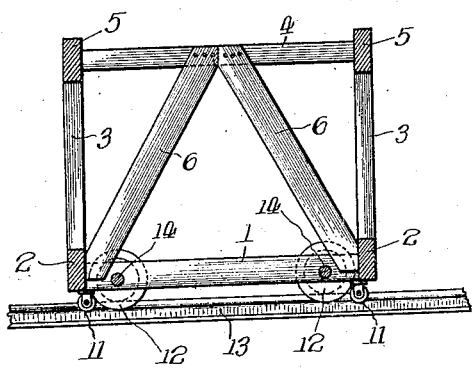
Fig. 3 is a cross section taken on line 3—3 in Fig. 2.

The truck is preferably arranged so that it may be moved or rolled either on a floor or on tracks. To such end it is provided with rollers or casters 11—11 adapted to rest and move on the floor and also with wheels 12—12 adapted to rest and travel on tracks 13—13. The rollers 11—11 are preferably secured underneath the joints formed by the members 6—6 and 2—2, as shown in Fig. 3. The wheels 12 are preferably mounted on axles 14 extending through the members 1—1. The lower surfaces of the rollers 11—11 are somewhat below the flanges on the wheels 12—12, so that when the truck rests on the floor it may rest on the rollers 11—11 and be free to move upon the same without interference with the wheels 12—12 or the flanges thereof. At the same time the truck may be placed so that the wheels 12—12 will rest and travel on the tracks 13—13, as shown in Fig. 1, at which time the rollers 11—11 will hang down between the tracks 13—13, but will not touch the floor, so that in this case the truck may travel on the rails 13—13 without any interference with or by the rollers 11—11.

It will be understood that changes and modifications may be made without departing from the spirit of the invention.

What I claim is:

1. A truck having floor rollers, track wheels and an upper supporting frame extending transversely to the direction of movement of the truck and overhanging one side thereof, and a device on the overhanging end of said frame adapted to engage an angular shaped body when the truck is tilted transversely about the rollers and wheels as pivots.

2. A truck having a supporting surface and devices at one end thereof adapted for engaging a corner of an angular shaped body, said truck being also provided with floor rollers and also with track wheels, said rollers having their lower surfaces below the lowermost surfaces of said wheels.

3. A truck having a supporting surface and devices at one end thereof adapted for engaging a corner of an angular shaped body, said truck being also provided with floor rollers and also with track wheels, said rollers having their lower surfaces below the lowermost surfaces of said wheels, and being located between said wheels.

4. A truck having a supporting surface and provided with floor rollers and also with track wheels, said rollers having their lower surfaces below the lowermost surfaces of said wheels, and being located relatively close to and between said wheels, said rollers being secured to the under side of said truck and the wheels being mounted on the ends of axles passing crosswise through the truck frame, whereby the truck can be tilted transversely about the wheels and rollers as pivots and the truck loaded in its transversely tilted position.

5. A truck having a lower horizontal frame, an upper horizontal frame, a plurality of members connecting the upper and lower horizontal frames to form therewith a rigid supporting body, and a plurality of supporting wheels mounted on the lower horizontal frame, said upper horizontal frame having laterally extending beams projecting beyond the sides of the supporting body, one end of said beams being adapted to engage angular shaped bodies to be loaded and the other end of said beams forming handles whereby the truck can be tilted transversely to its direction of movement and about the wheels farthest from the handles.

6. A truck having a lower horizontal frame, an upper horizontal frame, a plurality of members connecting the upper and lower horizontal frames to form therewith a rigid supporting body, and a plurality of supporting wheels mounted on the lower horizontal frame, said upper horizontal frame having laterally extending brackets projecting beyond the side of the supporting body, the outer end of said brackets being adapted to engage and support angular shaped bodies when the truck is tilted transversely, and handles on the opposite sides of the supporting body whereby the truck can be tilted transversely to its direction of movement and about the wheels farthest from the handles.

7. A truck having a lower horizontal frame, an upper horizontal frame and members connecting the lower and upper horizontal frames to form therewith a rigid supporting body, a plurality of track wheels mounted on the lower frame, a plurality of supporting rollers mounted on the lower frame relatively close to and between said wheels with the lower surface of the rollers below the lowermost surface of the wheels, said upper horizontal frame having laterally extending beams projecting beyond the sides of the supporting body, one end of said beams having L-shaped members fastened thereto, said L-shaped members being adapted to engage and support angular shaped bodies when the truck is tilted transversely, and the other end of said beams forming handles whereby the truck can be tilted transversely about the rollers and wheels, nearest the L-shaped members, as pivots.

In witness whereof, I hereunto subscribe my name this 7th day of January, A. D. 1921.

OTTO SCHULZ.